(12) United States Patent
Ziegler et al.

(10) Patent No.: US 8,598,933 B2
(45) Date of Patent: Dec. 3, 2013

(54) INPUT CURRENT SHAPING FOR TRANSITION AND DISCONTINUOUS MODE POWER CONVERTER

(75) Inventors: Silvio Ziegler, Tann (CH); Ivan Feno, Gossau (CH)

(73) Assignee: Power-One, Inc., Camarillo, CA (US)

( * ) Notice: Subject to any disclaimer, the term of this patent is extended or adjusted under 35 U.S.C. 154(b) by 9 days.

(21) Appl. No.: 13/370,417

(22) Filed: Feb. 10, 2012

(65) Prior Publication Data

US 2012/0212276 A1    Aug. 23, 2012

Related U.S. Application Data

(60) Provisional application No. 61/441,486, filed on Feb. 10, 2011.

(51) Int. Cl.
*H03K 3/00*    (2006.01)

(52) U.S. Cl.
USPC .......................................... 327/303; 323/222

(58) Field of Classification Search
USPC ......................................................... 327/303
See application file for complete search history.

(56) References Cited

U.S. PATENT DOCUMENTS

| 7,489,116 B2 * | 2/2009 | Lanni ............................ 323/222 |
| 2005/0276294 A1 | 12/2005 | Crawford et al. |
| 2010/0109615 A1 | 5/2010 | Hwang et al. |
| 2010/0110593 A1 | 5/2010 | Kim et al. |

FOREIGN PATENT DOCUMENTS

| EP | 1826896 A1 | 8/2007 |
| EP | 1887681 A1 | 2/2008 |

OTHER PUBLICATIONS

International Search Report in corresponding PCT application No. PCT/US2012/024643, dated Aug. 29, 2012 (3 pp).

\* cited by examiner

*Primary Examiner* — John Poos
(74) *Attorney, Agent, or Firm* — Waddey Patterson; Mark J. Patterson

(57) ABSTRACT

A power converter operable to draw an input current that is in phase with an input voltage of the power converter and proportional to a voltage of the input voltage of the power converter includes a drive switch, a waveform generator, and a current shaping circuit. The drive switch is connected between an input inductor and ground and draws current through the input inductor when turned on. The current shaping circuit provides an on-time of the drive switch for a next cycle of the drive switch as a function of an input current decay time, a switching period of the waveform generator, and an output voltage of the power converter. The waveform generator is responsive to the on-time provided by the current shaping circuit for selectively turning the drive switch on and off to cycle the drive switch as a function of the received on-time.

24 Claims, 8 Drawing Sheets

| FIG. 6A | FIG. 6B |
|---|---|

INPUT CURRENT SHAPING FOR TRANSITION AND DISCONTINUOUS MODE POWER CONVERTER

CROSS-REFERENCES TO RELATED APPLICATIONS

This application claims benefit of the following patent application which is hereby incorporated by reference: U.S. Provisional Patent Application No. 61/441,486, entitled "Input Current Shaping Method for Transition and Discontinues Mode Power Converter", filed Feb. 10, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention relates generally to power factor corrected power converters that work in the transition or discontinuous mode. More particularly, the invention relates to reducing total harmonic distortion and input current phase variation in such power converters.

Transition mode power converters have the desirable property that the current through the inductor after every switching cycle returns back to zero, so as to allow zero-current and zero-voltage switching of the main switch. While in theory the current of a power converter operating in the transition mode with a constant on-time switching scheme is always proportional to and in phase with the input voltage, practical limitations deteriorate the performance which results in a total-harmonic-distortion (THD) value that is unacceptable in certain applications.

One reason for the deviation from theoretical perfect behavior is that many transition mode controllers clamp the maximum switching frequency of the converter to limit the switching losses. As a result, the converter is not able to maintain the transition mode switching conditions and starts to work in the discontinuous switching mode where the average input current using a constant on-time switching scheme is not proportional to the input voltage.

Some transition mode controllers allow very high switching frequencies to improve the THD of the input current. This improves the THD at the cost of reduced efficiency due to increased driving and switching losses. However, the THD of the input current is still negatively affected close to the polarity changes of the input voltage. As a result of the small input voltage, the stored energy in the inductor becomes very small and is not able to commutate the boost diode due to the parasitic capacitances of the switching node.

Another technique for improving THD and input current phase matching is implementing a current mode controller, which automatically increases the on-time of the main switch close to the zero-crossing of the input voltage to follow the current reference, storing sufficient energy in the inductor to commutate the diode. A shortcoming of this method is that the average input current over one switching cycle needs to be sensed, which increases the cost and complexity for the control and current sensing.

BRIEF SUMMARY OF THE INVENTION

In one aspect of the present invention, a power converter operable to draw an input current that is in phase with an input voltage of the power converter and substantially proportional to a voltage of the input voltage of the power converter includes a drive switch, a waveform generator, and a current shaping circuit. The drive switch is connected between an input inductor and ground and is operable to draw current through the input inductor when turned on. The waveform generator is operable to selectively turn the drive switch on and off to cycle the drive switch. The current shaping circuit is operable to provide an on-time of the drive switch for a next cycle of the drive switch as a function of an input current decay time, a switching period of the waveform generator, and an output voltage of the power converter. The waveform generator is responsive to the on-time provided by the current shaping circuit for selectively turning the drive switch on and off to cycle the drive switch as a function of the received on-time.

In another aspect, a method of obtaining an input current that is in phase with an input voltage of a power converter and substantially proportional to a voltage of the input voltage of the power converter includes determining an input current decay time. The power converter includes a drive switch, and a waveform generator selectively turning the drive switch on and off to cycle the drive switch. The input current decay time is determined by measuring a time from turning off the drive switch until an input current of the input inductor reaches zero. A switching period of the waveform generator is determined, and an output voltage of the power converter is determined. An on-time of the drive switch for a next cycle of the drive switch is provided as a function of the determined input current decay time, switching period of the waveform generator, and output voltage of the power converter.

In another aspect, a multiphase power converter operable to draw an input current that is in phase with an input voltage of the power converter and substantially proportional to a voltage of the input voltage of the power converter includes a first phase circuit and a second phase circuit. The first phase circuit includes a first drive switch, a first waveform generator, and a current shaping circuit. The first phase circuit is operable to provide power to an output of the power converter. The first drive switch is connected between a first input inductor and ground and is operable to draw current through the first input inductor when turned on. The first waveform generator is operable to selectively turn the first drive switch on and off to cycle the first drive switch. The current shaping circuit is operable to provide an on-time of the first drive switch for a next cycle of the first drive switch as a function of an input current decay time, a switching period of the first waveform generator, and an output voltage of the power converter. The first waveform generator is responsive to the on-time provided by the current shaping circuit for selectively turning the first drive switch on and off to cycle the first drive switch as a function of the received on-time. The second phase circuit is also operable to provide power to the output of the power converter. The second phase circuit includes a second drive switch and a second waveform generator. The second drive switch is connected between a second input inductor and ground, and the second drive switch is operable to draw current through the second input inductor when turned on. The second waveform generator is operable to selectively turn the second drive switch on and off to cycle the second drive switch. The second waveform generator is responsive to the on-time provided by the current shaping circuit for selectively turning the second drive switch on and off to cycle the second drive switch as a function of the received on-time. The phase control circuit is operable to receive the on-time provided by the current shaping circuit of the first phase circuit, provide the received on-time to the first waveform generator of the first phase circuit, provide the received on-time to the second waveform generator of the second phase circuit, and coordinate operation of the first phase circuit and the second phase circuit such that the first phase circuit and the second phase circuit are not in phase with one another.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified.

DETAILED DESCRIPTION OF THE INVENTION

Figure 1:
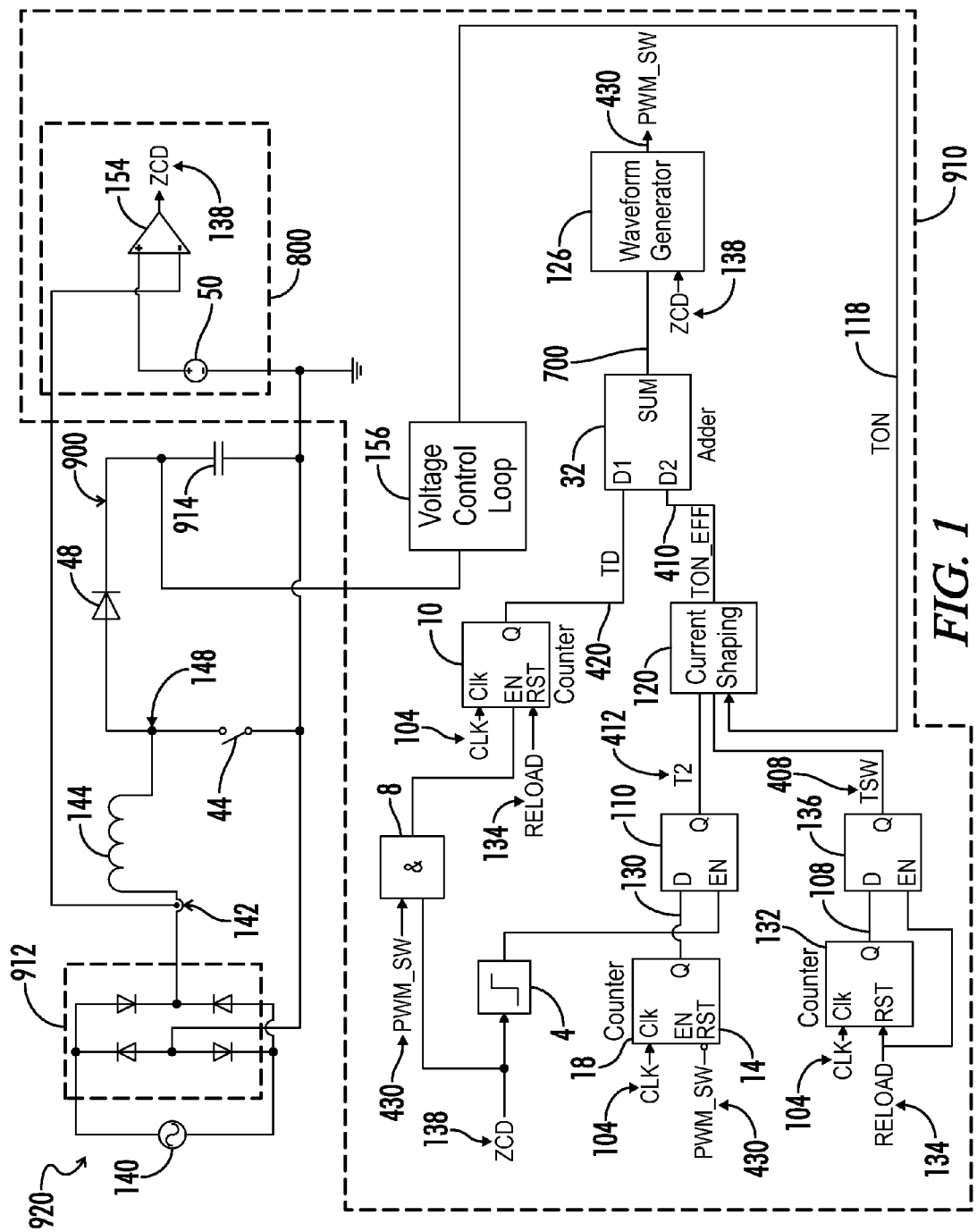
FIG. 1 is a schematic and block diagram of an embodiment of the present invention, showing a single phase power converter including current shaping based on power converter output voltage, switching period, and input current decay time, and an extension of the drive switch on-time based on a negative input current time.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The present invention discloses a current shaping circuit and method to modify the on-time of the drive switch in single or multi-phase transition or discontinuous mode power converters to obtain an input current that is proportional and in phase with the input voltage. This yields a low total harmonic distortion (THD) of the input current without the difficulty of sensing the average input current over one switching cycle.

In one embodiment, the drive switch on-time that is given by a voltage control loop of a power converter is modified according to an analytical formula that is based on timings of the switching waveforms. The timings are derived by a zero-current comparator (i.e., zero crossing detector) for the input current and the control signal for the drive switch of the power converter. The measured timing values are fed to a circuit implementing the analytical formula via multipliers, adders, subtracters and a square-root function, as will be more fully explained below.

In another embodiment, the performance (e.g., input current phase matching, proportionality, and THD) is further improved by accounting for a negative input current flowing at the time instant where the drive switch is closed (i.e., turned on via the control signal for the drive switch). A negative input current counter measures the time required to force the input current above the zero-level after closing the switch. This time is then added to the modified on-time for the drive switch as described above.

In yet another embodiment, a circuit and method are applicable to power converters where a negative current is flowing at the closure of the main switch. Compared with modifying the on-time of the drive switch provided by the voltage regulator based on input current decay time, a switching period of the drive switch, and an output voltage of the power converter, it greatly simplifies the cost of implementation but results in worse THD of the input current. The time required to drive the input current above the zero-level after the closure of the drive switch (i.e., the drive switch is turned on) is measured by a negative input current counter and added to the drive switch on-time output by the voltage regulator. This circuit and method may still considerably improve the THD without any modification of the on-time based on input current decay time, switching period of the drive switch, and output voltage of the power converter. As used herein, providing an on time based on an output voltage of the power converter may mean directly monitoring the output voltage of the power converter at a component and providing an on-time as a function of the monitored voltage, or monitoring a parameter (e.g., a default on time) provided by another component of the power converter as a function of the output voltage of the power converter and providing the on time as a function of the monitored parameter (i.e., indirectly accounting for the output voltage of the power converter when providing an on time).

In another embodiment, modifying a drive switch on-time provided by the voltage regulator based on input current decay time, switching period, and output voltage of the power converter is combined with extending the modified drive switch on-time by the time required to drive the current above the zero-level after the closure of the drive switch for a multiphase power converter, based on the measurements of a first phase of the multiphase transition mode or discontinuous mode power converter. A phase control circuit ensures that the two phases are working close to the same frequency, that both phases have very similar switching waveforms, and that the multiple phases are not in phase. This allows a current shaping circuit to measure the required timing parameters for the analytical modification of the drive switch on-time from any one of the phase circuits and a negative input current counter to measure the time required to drive the current above the zero-level after the closure of the drive switch of any of the phase circuits. The on-time of all phase circuits can then be modified based on the input current decay time, switching period of the drive switch, output voltage, and negative input current time measured from any one of the phase circuits. It is contemplated that this circuit and method can be applied to a power converter with any number of phase circuits that are controlled to have similar frequencies and switching waveforms.

Referring to FIG. 1, a power converter 920 includes an input voltage 140, a rectifier 912 (e.g., a full wave rectifier), an input inductor 144, an output diode 48, an output capacitor 914, a drive switch 44, and a controller 910 for providing a control signal (e.g., PWM_SW 430) to the drive switch 44 to selectively turn the drive switch 44 on and off (i.e., to cycle the drive switch 44 or provide an on-time to the drive switch 44). The rectifier 912 is connected to the input voltage 140, and a first end of the input inductor 144 is connected to an output of the rectifier 912. A second end of the input inductor 144 is connected to the anode of the output diode 148. The cathode of the output diode 148 is connected to a first terminal of the output capacitor 914, and a second terminal of the output capacitor 914 is connected to ground. The drive switch 44 is connected between the second end of the input inductor 144 and ground. A voltage control loop 156 of the controller 910 provides a default on-time for the drive switch 44 based on an output voltage 900 of the power converter 920. The output voltage 900 is the voltage at the cathode of the output diode 48. In one embodiment, the voltage control loop 156 determines the default on-time from the output voltage 900 of the power converter 920 via a lookup table or formula.

Figure 2:
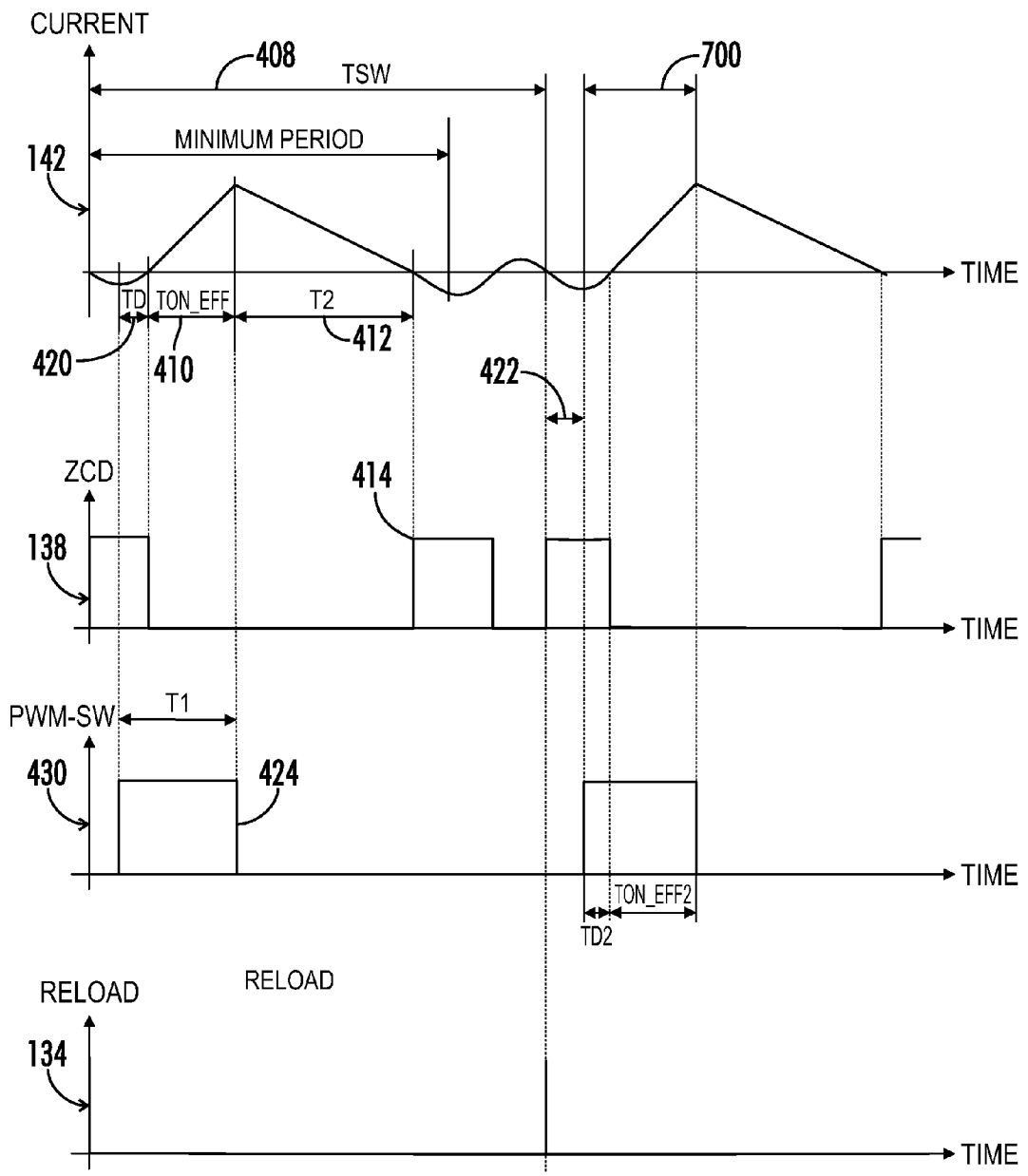
FIG. 2 is a timing diagram of input current, zero cross detection, drive switch control, and switching period detection for a power converter operating in the discontinuous mode, according to one aspect of the present invention.
Figure 4:
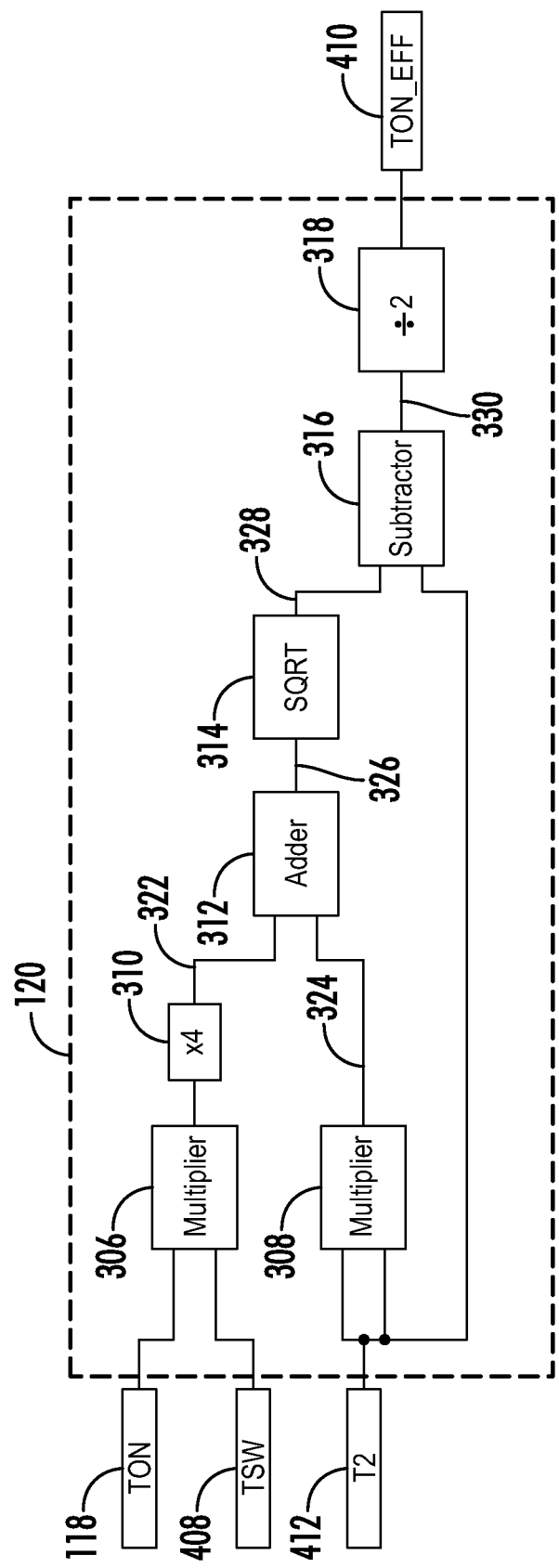
FIG. 4 is a block diagram of a current shaping circuit in accordance with one aspect of the present invention.

Referring to FIGS. 1 and 4, the power converter 920 of FIG. 1 may be described with reference to the timing diagram of FIG. 2. Certain reference characters in FIG. 1 indicate signals indicative of a time, event, or duration, and those times in the timing diagram of FIG. 2 are labeled with the same reference character. The average input current of a discontinuous mode power converter 920 over one switching cycle can be approximated according to EQUATION 1.

$$I = \frac{1}{2} * \frac{V_{IN}}{L} * \frac{T_{ON_{EFF}}(T_{ON_{EFF}} + T_2)}{T_{SW}} \qquad \text{EQUATION 1}$$

In EQUATION 1, $T_{ON\_EFF}$ is the effective on-time 410, $T_2$ is the time it takes for the current to decay back to zero (i.e., the input current decay time 412), and $T_{SW}$ is the switching period 408 of the drive switch of the power converter.

$$\frac{T_{ON\_EFF}(T_{ON\_EFF} + T_2)}{T_{SW}} \qquad \text{TERM 1}$$

TERM 1 is assumed to be constant to insure that the input current is proportional to and in phase with the input voltage $V_{IN}$ 140. If TERM 1 is assumed to be equal to the output of the voltage control loop 156 (i.e., $T_{ON}$ 118) (see EQUATION 2), then the effective on-time $T_{ON\_EFF}$ 410, can be evaluated by solving EQUATION 2 for $T_{ON\_EFF}$ 410 (see EQUATION 3).

$$T_{ON} = \frac{T_{ON\_EFF}(T_{ON\_EFF} + T_2)}{T_{SW}} \qquad \text{EQUATION 2}$$

$$T_{ON\_EFF} = \frac{\sqrt{T_2^2 + 4T_{ON}T_{SW}}}{2} \pm \frac{T_2}{2} \qquad \text{EQUATION 3}$$

If the converter works in the transition mode, then $T_{SW}$ 408 for a first switching cycle is (by definition) equal to the sum of $T_{ON}$ 118 and $T_2$ 412, which results in the effective on-time ($T_{ON\_EFF}$) 410 being equal to $T_{ON}$. Therefore, it can be concluded that the only valid solution for the effective on-time is EQUATION 4.

$$T_{ON\_EFF} = \frac{\sqrt{T_2^2 + 4T_{ON}T_{SW}}}{2} - \frac{T_2}{2} \qquad \text{EQUATION 4}$$

Using this equation it becomes possible to correct for the distortion of the average current in the next cycle of the drive switch if the converter works in the discontinuous mode. Accordingly, it is necessary to measure $T_2$ 412 and $T_{SW}$ 408, while $T_{ON}$ 118 is provided by the voltage control loop 156 to determine an on-time for the drive switch for a next switching cycle of the drive switch. Because the voltage control loop 156 is typically designed to exhibit low bandwidth as compared to the cycle time of the drive switch and/or the input voltage, the assumption that $T_{ON}$ 118 is constant over one line cycle of the input voltage 140 holds.

Referring again to FIG. 1, the input current decay time $T_2$ 412 is measured by an input current decay counter 18 that is driven by a clock 104 significantly faster than the switching frequency of a drive switch 44 of the power converter. The input current decay counter 18 starts counting when the drive switch control signal PWM_SW 430 goes digital low at time 424 (see FIG. 2), which is the conclusion of the on time of the present cycle T1. The count value 130 is overtaken by a latch 110 when the inductor current 142 decays to zero, which is indicated by the positive edge 414 of the zero-crossing signal 138 generated by the comparator 154 of the zero crossing detector 800 including the comparator 154 and the voltage source 50. In one embodiment, the zero-crossing signal 138 is passed to the latch 110 by an edge detector 4. The output of the latch 110 is a signal indicative of the input current decay time $T_2$ 412 and is used as an input to the current shaping circuit 120.

The switching period $T_{SW}$ 408 is measured by a switching period counter 132 that is triggered by a re-load pulse in a re-load signal 134. The re-load pulse in the re-load signal 134 indicates the transition between adjacent switching periods, and is generated by the waveform generator 126. In one embodiment, the drive switch 44 is not immediately switched on at the beginning of the switching period 408 by the waveform generator 126 and is instead delayed by a predetermined delay 422 to allow the voltage at the switching node 148 to commutate to zero. When the switching period $T_{SW}$ 408 is restarted by the re-load signal 134, the output 108 of counter 132 is overtaken by latch 136 and provides a proportional measure for the switching period $T_{SW}$ 408 to the input of the current shaping circuit 120.

Using the measured variables $T_{SW}$ 408 and $T_2$ 412 together with the output of the voltage control loop $T_{ON}$ 118, the current shaping circuit 120 calculates in real time the effective on-time $T_{ON\_EFF}$ 410 according to EQUATION 1 for the next switching period of the drive switch 44.

The described method to measure $T_{SW}$ 408 and $T_2$ 412 is to be understood as one possible implementation, while those skilled in the art will appreciate that there are other means to determine the same time intervals that still fall within the spirit and scope of the claims.

In certain embodiments of the power converter 920, the current 142 is below zero due to resonances between the parasitic capacitance of the switching node 148 and the inductor 144. Thus, there is a delay (i.e., TD 420) between when the drive switch 44 is turned on and when the current 142 becomes positive. To minimize THD, this delay (i.e., TD 420) is accounted for in certain embodiments. A negative input current counter 10 receives the clock signal 104 which is significantly faster than the switching frequency of the power converter to provide sufficient resolution, and the negative input current counter 10 is enabled by the logic AND gate 8 of the switch driving signal PWM_SW 430 and the output 138 of the zero-crossing comparator 154. The output (i.e., TD 420) of the negative input current counter 10 is then added to the output of the current shaping circuit 120 using an adder 32. The sum 700 of the two signals (i.e., $T_{ON\_EFF}$ 410 and TD 420), which accounts for the input current 142 being below zero when the drive switch 44 closes (i.e., is turned on) and actual average current, is then fed into the waveform generator 126 as the on time for a next cycle of the drive switch 44 to generate a control signal PWM_SW 430 for the next cycle of the drive switch 44.

Figure 3:
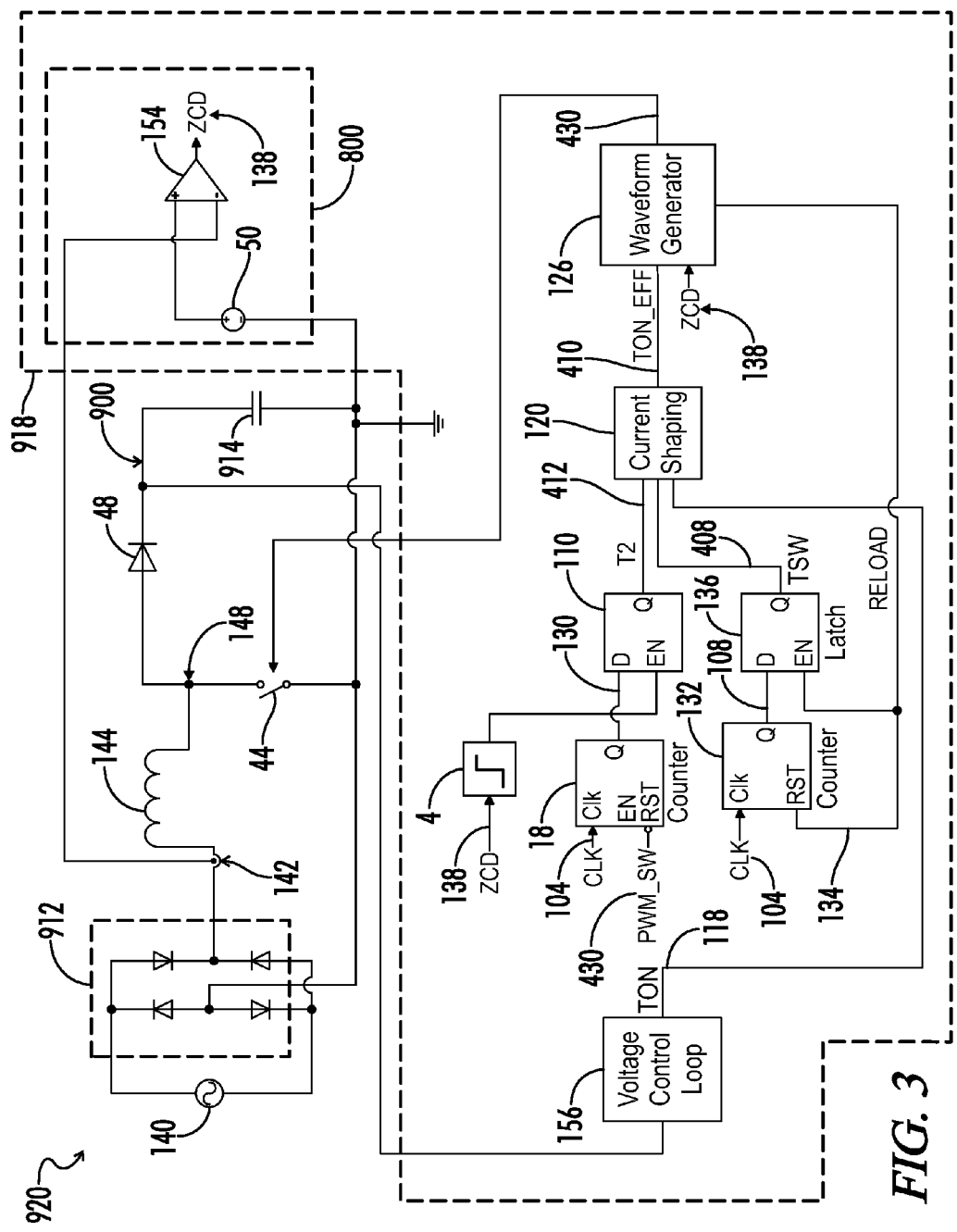
FIG. 3 is a schematic and block diagram of an embodiment of the present invention, showing a single phase power converter including current shaping based on power converter output voltage, switching period, and input current decay time.

Referring to FIG. 3, a power converter 920 includes a controller 918 which accounts for the difference between theoretical average current and actual average current based on T2 412 and $T_{SW}$ 408, but not for the time that the input current 142 is below zero after the drive switch 44 closes (i.e., is turned on). That is, controller 918 lacks the logic AND gate 8, negative input current counter 10, and adder 32 of the controller 910 of FIG. 1. Instead, $T_{ON\_EFF}$ 410 is provided directly from the current shaping circuit 120 to the waveform generator 126.

Referring to FIG. 4, one embodiment of current shaping circuit 120 is shown. The current shaping circuit 120 receives a signal 118 indicative of $T_{ON}$, a signal 408 indicative of $T_{SW}$, and a signal 412 indicative of $T_2$. A first multiplier 306 multiplies the default on-time $T_{ON}$ 118 provided by the voltage control loop 156 by the switching period $T_{SW}$ 408 of the waveform generator 126 to obtain a first product, and a second multiplier 310 multiplies the first product by 4 to obtain a second product 322. A third multiplier 308 multiplies the input current decay time T2 412 by itself to obtain a third product 324. Adder 312 adds the second product 322 to the third product 324 to obtain a first sum 326. A square root circuit 314 finds the square root (i.e., a root 328) of the first sum 326, and provides the root 328 to a subtractor 316. Subtractor 316 subtracts T2 412 from the root 328 to obtain a difference 330. A divider 318 divides the difference 330 by 2 to obtain an effective on-time $T_{ON\_EFF}$ 410 of the drive switch 44 for the next cycle of the drive switch 44. In one embodiment, the current shaping circuit 120 provides the effective on-time $T_{ON\_EFF}$ 410 to the waveform generator 126 as the on-time of the drive switch 44 for the next cycle of the drive switch 44 (see, for example, FIG. 4).

In one embodiment, the second multiplier 310 is implemented as a two bit left shift. The square root circuit 314 may be implemented, for example, using a table, polynomial, or piece-wise linear approximation. In one embodiment, the divider 318 is implemented as a shift register executing a right shift by one bit position.

Figure 5:
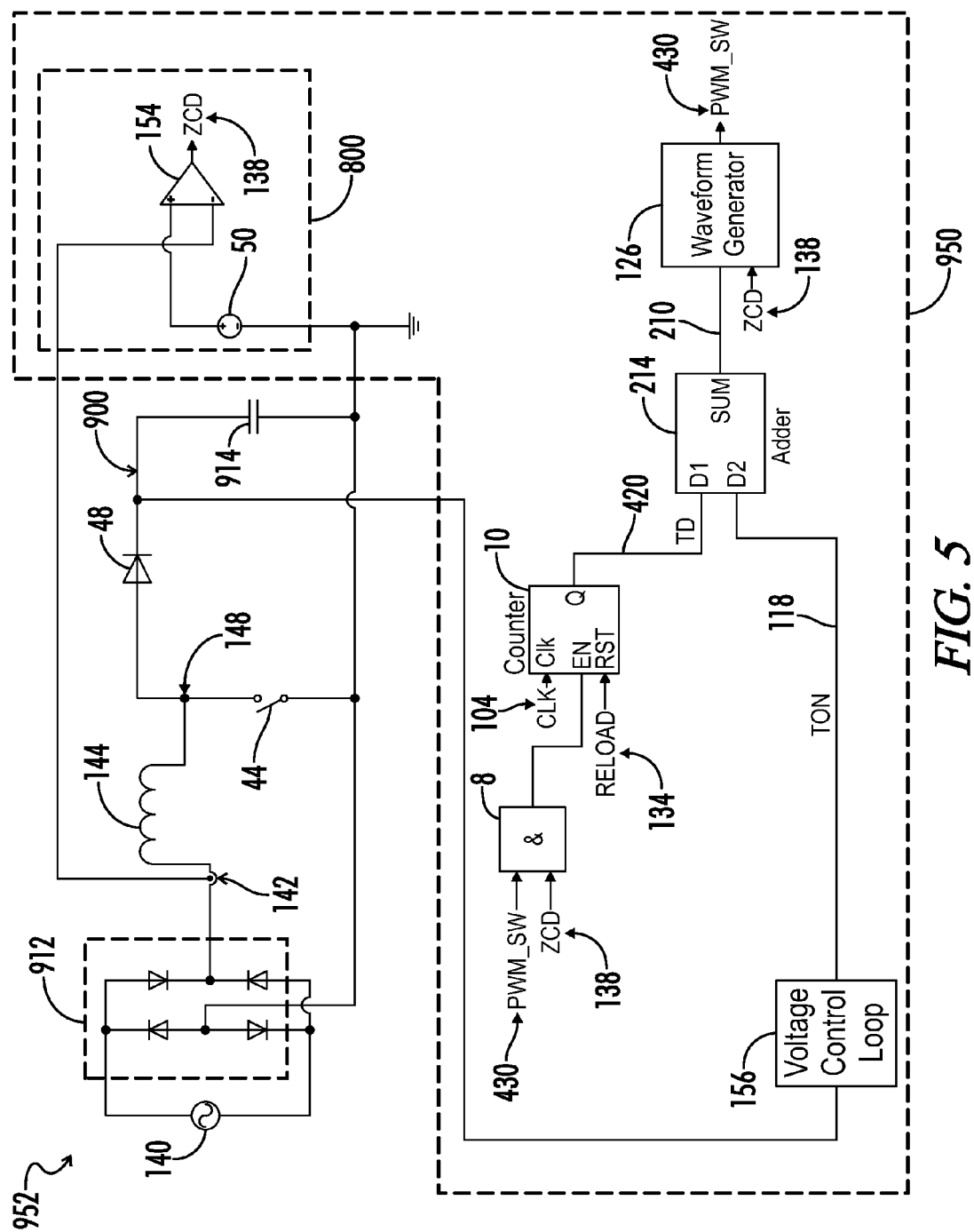
FIG. 5 is a schematic and block diagram of an embodiment of the present invention, showing a single phase power converter that extends the drive switch on-time based on a negative input current time.

Referring to FIG. 5, a power converter 952 has a controller 950 that excludes the current shaping circuit 120 and the components for measuring the input current decay time $T_2$ 412 and the switching period $T_{SW}$ 408 of the waveform generator 126. The controller 950 of the power converter 952 accounts for the negative input current time TD 420 as described above. The negative input current time TD 420 is added to the default on-time $T_{ON}$ 118 provided by the voltage control loop 156 by an adder 214 to yield an on-time 210. The adder provides the on-time 210 to the waveform generator 126, which provides the control signal to the drive switch 44 as a function of the received total on-time 210.

Even though the power converter 952 of FIG. 5 does not account for the inaccuracy of current control if the power converter 952 is working in the discontinuous mode, it significantly enhances the performance around the zero-crossing of the line voltage 140, reducing THD. This is because at low peak input voltages 140 the on-time of the drive switch 44 needs to be significantly prolonged to raise the input inductor current 142 above zero after turning on switch 44. In contrast to a constant on-time control (i.e., an on-time based only on the voltage control loop 156 default on-time $T_{ON}$ 118), the power converter 952 of FIG. 5 is able to deliver stable power to the output 900 at very low input voltages (e.g., when the peak voltage or amplitude of the input voltage is very low).

Figures 6, 6A:
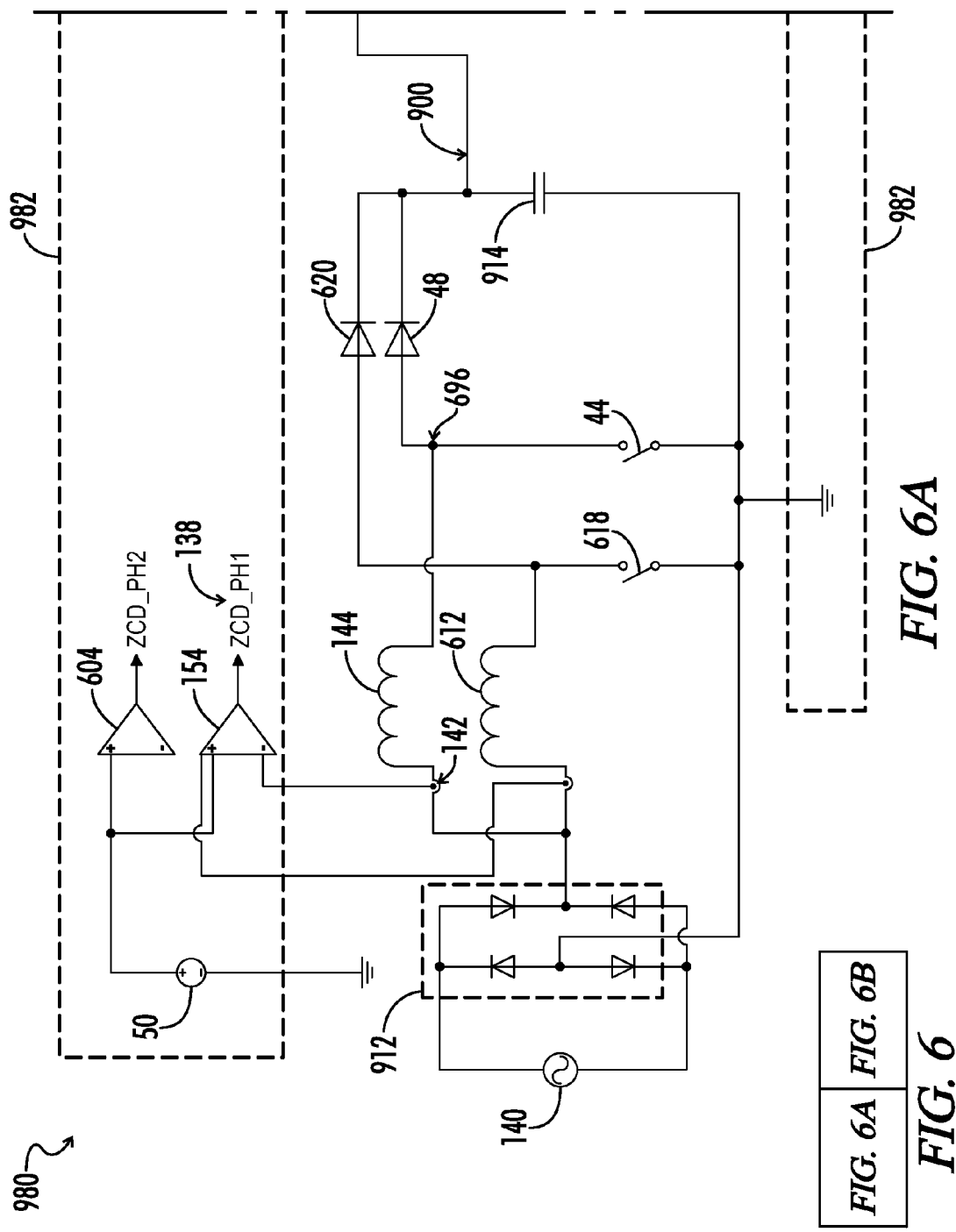
FIG. 6 is a schematic and block diagram of an embodiment of the present invention, showing a multiphase (i.e., two phases shown) power converter including current shaping based on power converter output voltage, switching period of a first drive switch, and input current decay time in a first phase, and an extension of the drive switch on-time based on a negative input current time of the first phase.
Figure 6B:
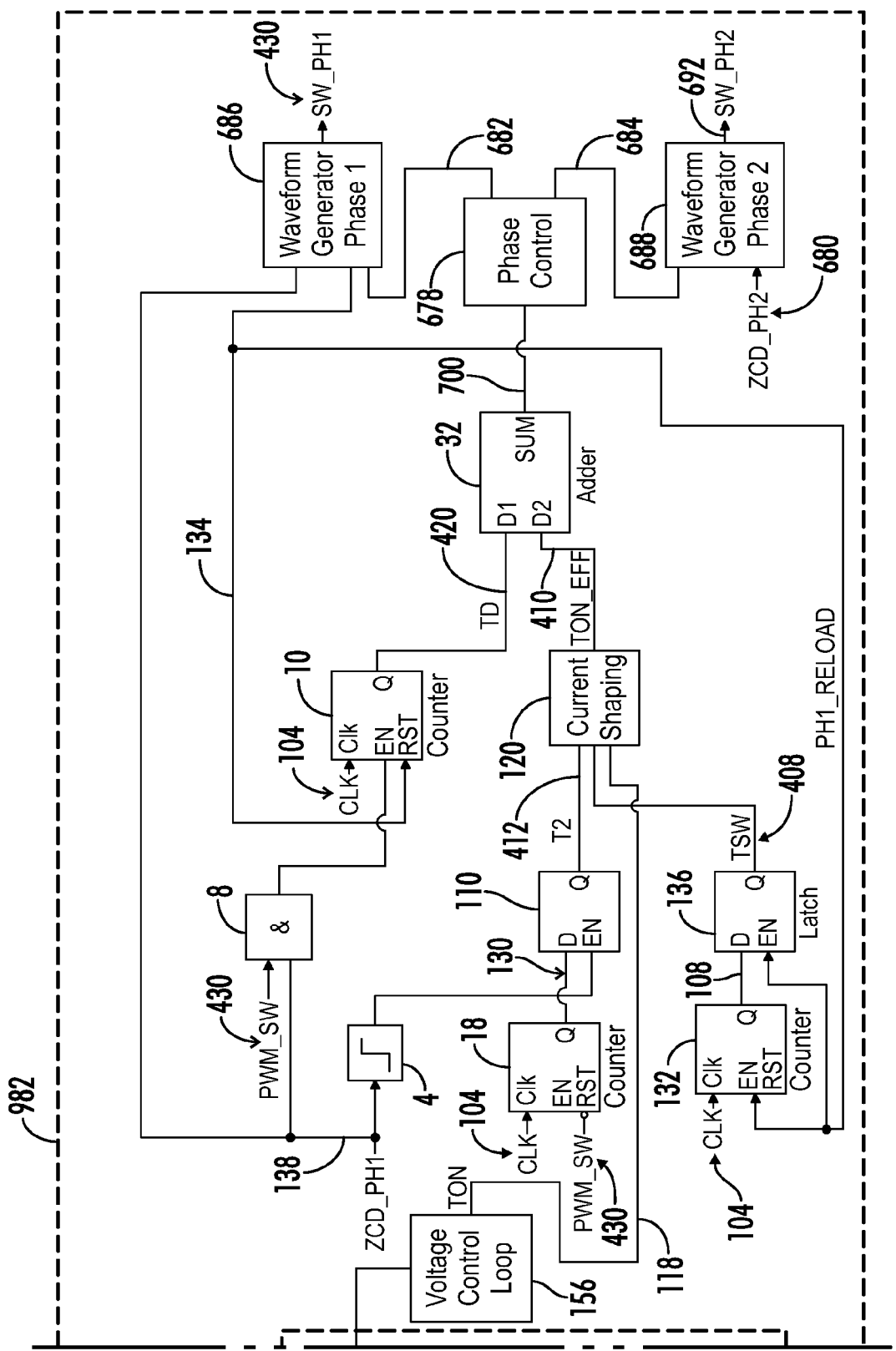

Referring to FIG. 6, a multiphase power converter 980 (i.e., a two-phase power converter) has a first phase circuit similar to that of FIG. 1 as described above. A second phase circuit includes a second input inductor 612, a second drive switch 618, and a second output diode 620. The second input inductor 612 has a first end connected to the output of the rectifier 912 and a second end connected to the anode of the second output diode 620. The second drive switch 618 is connected between the second side of the second input inductor 612 and ground. The cathode of the second output diode 620 is connected to the output 900 of the multiphase power converter 980. A controller 982 of the multiphase power converter 980 is similar to the single phase controller 910 of the power converter 920 of FIG. 1, except that the effective on-time $T_{ON\_EFF}$ 410 calculated for the first phase circuit is supplied to a phase controller 678 which, based on the supplied effective on-time $T_{ON\_EFF}$ 410, provides an on-time 682 for the next cycle of the first drive switch 44 to a first waveform generator 686 and an on-time 684 for the next cycle of the second drive switch 618 to the second waveform generator 688. Further, in the illustrated embodiment, the phase controller 678 provides the on-time 682 for the next cycle of the first drive switch 44 to the a first waveform generator 686 and an on-time 684 for the next cycle of the second drive switch 618 to the second waveform generator 688 as a function of a sum 700 of the effective on-time $T_{ON\_EFF}$ 410 and delay time TD 420. The first waveform generator 686 provides a first control signal SW_PH1 430 to the first drive switch 44, and the second waveform generator 688 provides a second control signal SW_PH2 692 to the second drive switch 618. Thus, the on-time of the second drive switch 618 for a next cycle of the second drive switch 618 is determined based on the input current decay time and switching period of the first phase circuit. In the embodiment of FIG. 6, the on-time of the next cycle of the second drive switch 618 is also extended by the negative input current time of the first phase circuit. The phase control circuit 678 coordinates operation of the first drive switch 44 and the second drive switch 618 such that the drive switch as are out of phase (e.g., 180 degrees out of phase). It is contemplated that the multiphase power converter 980 may include any number of coordinated phase circuits.

Figure 7:
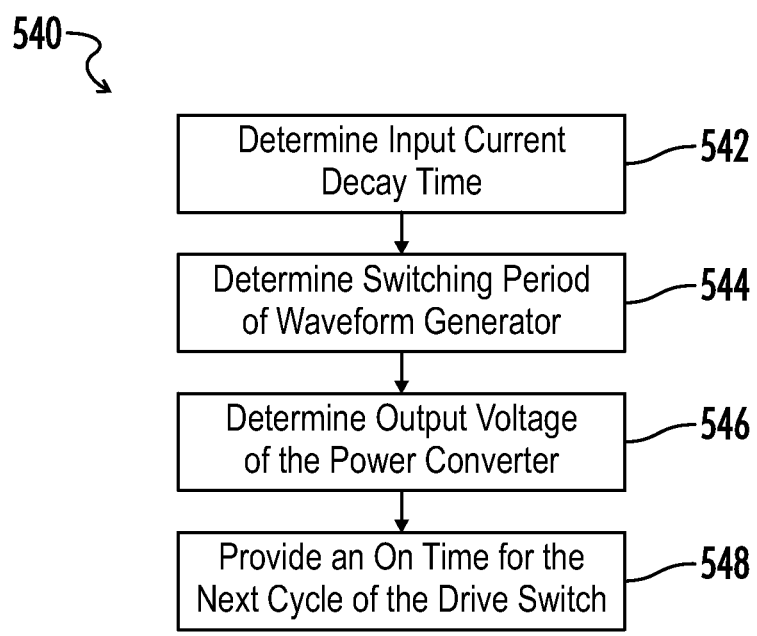
FIG. 7 is a flow chart of a method of obtaining an input current that is in phase with an input voltage of a power converter and substantially proportional to a voltage of the input voltage of the power converter.

Referring to FIG. 7, a method of 540 of training an input current that is in phase with an input voltage of the power converter and substantially proportional to a voltage of the input voltage of the power converter includes determining an input current decay time at 542. The power converter includes a drive switch and a waveform generator operable to selectively turn the drive switch on and off to cycle the drive switch. At 542, the input current decay time is determined by measuring a time from turning off the drive switch until an input current of the input inductor reaches zero. At 544, a switching period of the waveform generator is determined, and at 546, and output voltage of the power converter is determined. At 548, an on-time of the drive switch for a next cycle of the drive switch is provided as a function of the determined input current decay time, switching period of the waveform generator, and output voltage of the power converter.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful Input Current Shaping for Transition and Discontinuous Mode Power Converter, it is not intended that such references be construed as limitations upon the scope of this invention except as set forth in the following claims.

What is claimed is:

1. A power converter operable to draw an input current that is in phase with an input voltage of the power converter and substantially proportional to a voltage of the input voltage of the power converter, the power converter comprising:
   an input inductor;
   a drive switch connected between the input inductor and ground, the drive switch operable to draw current through the input inductor when turned on;
   a waveform generator operable to selectively turn the drive switch on and off to cycle the drive switch; and
   a current shaping circuit operable to provide an on-time of the drive switch for a next cycle of the drive switch as a function of an input current decay time, a switching period of the waveform generator, and an output voltage of the power converter,
   wherein the waveform generator is responsive to the on-time provided by the current shaping circuit for selectively turning the drive switch on and off to cycle the drive switch as a function of the received on-time, and
   wherein the waveform generator has a predetermined delay between providing a re-load pulse in a re-load signal of the waveform generator and turning on the drive switch.

2. The power converter of claim 1, further comprising a switching period counter operable to monitor a re-load signal of the waveform generator and determine a time between re-load pulses in the re-load signal, wherein the time between re-load pulses in the re-load signal is the switching period of the waveform generator.

3. The power converter of claim 1, further comprising an output diode, wherein the power converter is a power factor correcting power converter for converting an alternating current input to a direct current output and the drive switch is connected between ground and a node formed at the junction of the input inductor and the output diode. connected between ground and a node formed at the junction of the input inductor and the output diode.

4. The power converter of claim 1, further comprising:
a voltage control loop operable to provide a default on-time of the drive switch as a function of the output voltage of the power converter, wherein the default on-time of the drive switch is a predetermined value corresponding to the output voltage of the power converter;
wherein the current shaping circuit comprises
a first multiplier operable to multiply the default on-time of the drive switch provided by the voltage control loop by the switching period of the waveform generator to obtain a first product,
a second multiplier operable to multiply the first product by 4 to obtain a second product,
a third multiplier operable to multiply the input current decay time by the input current decay time to obtain a third product,
an adder operable to add the second product to the third product to obtain a first sum,
a square root circuit operable to determine the square root of the first sum to obtain a root,
a subtractor operable to deduct the input current decay time from the root to obtain a difference, and
a divider operable to divide the difference by 2 to obtain an effective on-time of the drive switch for the next cycle; and
wherein the current shaping circuit provides the effective on-time of the drive switch for the next cycle to the waveform generator as the on-time of the drive switch for the next cycle.

5. The power converter of claim 1, further comprising:
a negative input current counter operable to extend the on-time of the drive switch for the next cycle of the drive switch by a negative input current time if the input current is negative when the waveform generator turns on the drive switch; and
wherein the negative input current counter is further operable to determine the negative input current time by measuring a time from turning on the drive switch until the input current reaches zero.

6. The power converter of claim 1, further comprising:
a zero crossing detector operable to provide a digital high output when the input current becomes positive and a digital low output when the input current becomes negative;
a current decay counter operable to count between when the drive switch turns off until the zero crossing detector provides the digital high output; and
wherein the count between when the drive switch turns off until the zero crossing detector provides the digital high output is the input current decay time.

7. A method of obtaining an input current that is in phase with an input voltage of a power converter and substantially proportional to a voltage of the input voltage of the power converter, the power converter including a drive switch, and input inductor, and a waveform generator operable to selectively turn the drive switch on and off to cycle the drive switch, the method comprising:
determining an input current decay time, wherein the input current decay time is determined by measuring a time from turning off the drive switch until an input current of the input inductor reaches zero;
determining a switching period of the waveform generator;
determining an output voltage of the power converter; and
providing an on-time of the drive switch for a next cycle of the drive switch as a function of the determined input current decay time, switching period of the waveform generator, and output voltage of the power converter, and
wherein the waveform generator has a predetermined delay between providing a re-load pulse in a re-load signal of the waveform generator and turning on the drive switch.

8. The method of claim 7, wherein determining the switching period comprises monitoring a re-load signal of the waveform generator and determining a time between re-load pulses in the re-load signal, wherein the time between re-load pulses in the re-load signal is the switching period of the waveform generator.

9. The method of claim 7, wherein the power converter is a power factor correcting power converter for converting an alternating current input to a direct current output, and the power converter includes an input inductor and an output diode, wherein the drive switch is connected between ground and a node formed at the junction of the input inductor and the output diode.

10. The method of claim 7, wherein providing the effective on-time of the drive switch for a next cycle of the drive switch as a function of the determined input current decay time, switching period of the waveform generator, and output voltage of the power converter comprises:
providing a default on-time of the drive switch from a voltage control loop of the power converter as a function of the output voltage of the power converter, wherein the default on-time of the drive switch provided by the voltage control loop of the power converter is a predetermined value corresponding to the output voltage of the power converter;
multiplying the provided default on-time of the drive switch by the switching period of the waveform generator to obtain a first product;
multiplying the first product by 4 to obtain a second product;
multiplying the input current decay time by the input current decay time to obtain a third product;
adding the second product to the third product to obtain a first sum;
determining the square root of the first sum to obtain a root;
deducting the input current decay time from the root to obtain a difference;
dividing the difference by 2 to obtain an effective on-time of the drive switch for the next cycle; and
providing the effective on-time of the drive switch for the next cycle to the waveform generator.

11. The method of claim 7, wherein providing the on-time of the drive switch for the next cycle of the drive switch comprises extending the on-time of the drive switch for the next cycle of the drive switch by a negative input current time if the input current is negative when the waveform generator turns on the drive switch, wherein the negative input current time is determined by measuring a time from turning on the drive switch until the input current reaches zero.

12. A multiphase power converter operable to draw an input current that is in phase with an input voltage of the power converter and substantially proportional to a voltage of the input voltage of the power converter, the multiphase power converter comprising:
- a first phase circuit operable to provide power to an output of the power converter, the first phase circuit comprising
  - a first drive switch connected between a first input inductor and ground, the first drive switch operable to draw current through the first input inductor when turned on,
  - a first waveform generator operable to selectively turn the first drive switch on and off to cycle the first drive switch, and
  - a current shaping circuit operable to provide an on-time of the first drive switch for a next cycle of the first drive switch as a function of an input current decay time, a switching period of the first waveform generator, and an output voltage of the power converter;
  - wherein the first waveform generator is responsive to the on-time provided by the current shaping circuit for selectively turning the first drive switch on and off to cycle the first drive switch as a function of the received on-time;
- a second phase circuit operable to provide power to the output of the power converter, the second phase circuit comprising
  - a second drive switch connected between a second input inductor and ground, the second drive switch operable to draw current through the second input inductor when turned on, and
  - a second waveform generator operable to selectively turn the second drive switch on and off to cycle the second drive switch, wherein the second waveform generator is responsive to the on-time provided by the current shaping circuit for selectively turning the second drive switch on and off to cycle the second drive switch as a function of the received on-time; and
- a phase control circuit operable to
  - receive the on-time provided by the current shaping circuit of the first phase circuit,
  - provide the received on-time to the first waveform generator of the first phase circuit,
  - provide the received on-time to the second waveform generator of the second phase circuit, and
  - coordinate operation of the first phase circuit and the second phase circuit such that the first phase circuit and the second phase circuit are not in phase with one another.

13. The multiphase power converter of claim 12, wherein the first waveform generator has a predetermined delay between providing a re-load pulse in a re-load signal of the first waveform generator and turning on the first drive switch.

14. The multiphase power converter of claim 12, wherein the first phase circuit further comprises a switching period counter operable to monitor a re-load signal of the first waveform generator and determine a time between re-load pulses in the re-load signal, wherein the time between re-load pulses in the re-load signal is the switching period of the first waveform generator.

15. The multiphase power converter of claim 12, wherein the first phase circuit further comprises a first output diode, wherein the first drive switch is connected between ground and a node formed at the junction of the first input inductor and the first output diode, and the multiphase power converter is a power factor correcting power converter for converting an alternating current input to a direct current output.

16. The multiphase power converter of claim 12, further comprising:
- a voltage control loop operable to provide a default on-time of the first drive switch as a function of the output voltage of the power converter, wherein the default on-time of the first drive switch is a predetermined value corresponding to the output voltage of the power converter;
- the current shaping circuit of the first phase circuit comprises
  - a first multiplier operable to multiply the default on-time of the first drive switch provided by the voltage control loop by the switching period of the first waveform generator to obtain a first product,
  - a second multiplier operable to multiply the first product by 4 to obtain a second product,
  - a third multiplier operable to multiply the input current decay time by the input current decay time to obtain a third product,
  - an adder operable to add the second product to the third product to obtain a first sum,
  - a square root circuit operable to determine the square root of the first sum to obtain a root,
  - a subtractor operable to deduct the input current decay time from the root to obtain a difference, and
  - a divider operable to divide the difference by 2 to obtain an effective on-time of the first drive switch for the next cycle; and
- wherein the current shaping circuit provides the effective on-time of the first drive switch for the next cycle to the phase control circuit as the on-time of the first drive switch for the next cycle.

17. The multiphase power converter of claim 12, wherein the first phase circuit further comprises a negative input current counter operable to extend the on-time of the first drive switch for the next cycle of the first drive switch by a negative input current time if the input current is negative when the first waveform generator turns on the first drive switch, wherein the negative input current counter is operable to determine the negative input current time by measuring a time from turning on the first drive switch until the input current reaches zero.

18. The multiphase power converter of claim 12, wherein the first phase circuit further comprises a zero crossing detector operable to provide a digital low output when the input current becomes positive and a digital high output when the input current becomes negative, and a current decay counter operable to count between when the first drive switch turns off until the zero crossing detector provides the digital high output, wherein the count between when the first drive switch turns off until the zero crossing detector provides the digital high output is the input current decay time.

19. A power converter operable to draw an input current that is in phase with an input voltage of the power converter and substantially proportional to a voltage of the input voltage of the power converter, the power converter comprising:
- a drive switch connected between an input inductor and ground, the drive switch operable to draw current through the input inductor when turned on;
- a waveform generator operable to selectively turn the drive switch on and off to cycle the drive switch;
- a negative input current counter operable to provide an on-time of the drive switch for a next cycle of the drive switch extended by a negative input current time if the input current is negative when the waveform generator turns on the drive switch, wherein the negative input current counter is operable to determine the negative input current time by measuring a time from turning on the drive switch until the input current reaches zero, and wherein the waveform generator is responsive to the on-time provided by the negative input current counter for selectively turning the drive switch on and off to cycle the drive switch as a function of the received on-time.

20. The power converter of claim 19 further comprising:
a current shaping circuit operable to extend the on-time of the drive switch for the next cycle of the drive switch as a function of an input current decay time, a switching period of the waveform generator, and an output voltage of the power converter; and
a voltage control loop operable to provide a default on-time of the drive switch as a function of the output voltage of the power converter, wherein the default on-time of the drive switch is a predetermined value corresponding to the output voltage of the power converter;
wherein the current shaping circuit comprises
  a first multiplier operable to multiply the provided default on-time of the drive switch by the switching period of the waveform generator to obtain a first product,
  a second multiplier operable to multiply the first product by 4 to obtain a second product,
  a third multiplier operable to multiply the input current decay time by the input current decay time to obtain a third product,
  an adder operable to add the second product to the third product to obtain a first sum,
  a square root circuit operable to determine the square root of the first sum to obtain a root,
  a subtractor operable to deduct the input current decay time from the root to obtain a difference, and
  a divider operable to divide the difference by 2 to obtain an effective on-time of the drive switch for the next cycle.

21. The power converter of claim 20, wherein the waveform generator has a predetermined delay between providing a re-load pulse in a re-load signal of the waveform generator and turning on the drive switch.

22. The power converter of claim 20, further comprising a switching period counter operable to monitor a re-load signal of the waveform generator and determine a time between re-load pulses in the re-load signal, wherein the time between re-load pulses in the re-load signal is the switching period of the waveform generator.

23. The power converter of claim 20, further comprising an output diode, wherein the power converter is a power factor correcting power converter for converting an alternating current input to a direct current output and the drive switch is connected between ground and a node formed at the junction of the input inductor and the output diode.

24. The power converter of claim 1, further comprising:
a zero crossing detector operable to provide a digital high output when the input current becomes negative and a digital low output when the input current becomes positive;
a current decay counter operable to count between when the drive switch turns off until the zero crossing detector provides the digital high output; and
wherein the count between when the drive switch turns off until the zero crossing detector provides the digital high output is the input current decay time.

* * * * *